(12) United States Patent
Fellows et al.

(10) Patent No.: US 7,148,976 B1
(45) Date of Patent: Dec. 12, 2006

(54) IMAGE CAPTURE AND PROCESSING SYSTEM HEALTH CHECK

(75) Inventors: Christine A. Fellows, Charlotte, NC (US); John R. Hillery, Charlotte, NC (US); Bina M. Hallman, Charlotte, NC (US); Rodney G. Moon, Charlotte, NC (US); Ravi Prakash, Concord, NC (US)

(73) Assignee: International Business Machine Corporation, Armonk, NY (US)

( * ) Notice: Subject to any disclaimer, the term of this patent is extended or adjusted under 35 U.S.C. 154(b) by 1017 days.

(21) Appl. No.: 09/598,141

(22) Filed: Jun. 21, 2000

(51) Int. Cl.
*H04N 1/32* (2006.01)
*H04N 1/00* (2006.01)
*H04N 1/46* (2006.01)
*G06F 15/00* (2006.01)

(52) U.S. Cl. .................. 358/1.14; 358/468; 358/448; 358/406; 358/504; 358/1.1

(58) Field of Classification Search ............... 358/446, 358/461, 464, 465, 466, 1.14, 468, 448, 406, 358/504, 1.1
See application file for complete search history.

(56) References Cited

U.S. PATENT DOCUMENTS

| | | | |
|---|---|---|---|
| 5,297,256 A | * | 3/1994 | Wolstenholme et al. .... 702/183 |
| 5,995,775 A | * | 11/1999 | Budnik et al. ................ 399/31 |
| 6,016,204 A | * | 1/2000 | Budnik et al. ............. 358/1.14 |
| 6,631,247 B1 | * | 10/2003 | Motoyama et al. ............ 399/8 |
| 6,735,641 B1 | * | 5/2004 | Kobayashi et al. ........... 710/15 |

* cited by examiner

*Primary Examiner*—Twyler Lamb
*Assistant Examiner*—Houshang Safaipour
(74) *Attorney, Agent, or Firm*—Karl O. Hesse; Norman L. Gundel

(57) ABSTRACT

A system which provides a continuous indication of the operating integrity, of an entire image capture and processing system without the need for interfering with document throughput or the need for special paper test documents to be inserted into the scanning path. The system monitors performance from document presentation and scanner output, through image processing. It schedules maintenance of the system on an actual as needed basis. It continuously collects and monitors the imaging characteristics from work documents being processed and calculates a projected date at which maintenance will be required in order to retain system operating integrity. Minimum and maximum video values are collected from the output of each picture element sensor for each document. A running indication of system integrity is stored in a white trend array and a black trend array. These arrays are adjusted after an interval of time or one or more documents have been processed. The change in value of a trend array element depends upon whether the change indicated by the processing of the previous document indicates a deterioration of performance or a return to acceptable performance by the image capture system. After a further interval, the arrays are shifted in parallel to develop a maximum trend and a minimum trend for each picture element.

16 Claims, 7 Drawing Sheets

IMAGE CAPTURE AND PROCESSING SYSTEM HEALTH CHECK

BACKGROUND OF THE INVENTION

1. Field of the Invention

The present invention relates to a method and apparatus for determining the condition of an image capture system. More particularly, the present invention relates to a method, apparatus and computer program product for determining the quality of performance of an image capture system while it is capturing images which are being scanned using imaging apparatus, such as a document scanner.

2. Description of Related Art

Banks routinely process checks and other financial instruments based on information gleaned from a digital image of a document. These checks are processed at high speed and any attempt to monitor the condition of the image capture and analysis system by visually inspecting sample images or inserting sample test paper documents into the document path seriously impacts the throughput of the system. Accordingly, there has been a need for a method and apparatus that continuously checks the health of an image capture system without human intervention while the system is in operation.

As users of image processing place more and more reliance on the captured images, the need to ensure that the image capture system is reliably capturing high quality images becomes acute. Reliability is ensured in the known art by scheduling preventative maintenance on a conservative more often than actually required basis. Examples of methods for scheduling maintenance on a time and/or usage basis is described in IBM Technical Disclosure Bulletin, February 1994, pages 645 through 647, and IBM Technical Disclosure Bulletin May 1998, page 5338.

Such continued maintenance keeps the system running smoothly but is costly both from service costs and system down time points of view. Even when maintained on a very frequent schedule, there often occurs a situation where excessively dirty or dusty documents or other unusual conditions cause the performance of an image capture system to deteriorate beyond acceptable limits and the system shuts down with an error condition. Even worse, the system may not shut down but continue to capture inferior images until the reduced quality is noted manually by an operator or user of the images. By that time it may be too late to easily recover acceptable images as the originals may have been sent away or even destroyed. Such reduced quality may originate in systems where video gain and offset is automatically increased to compensate for illumination degradation, paper dust and other irregularities.

A typical technique for determining the present level of scanner and system performance or deterioration is to present a test target to the scanner and analyze the scanner output. The problem is that this interferes with normal use of the scanner and reduces scanner throughput. In one example of slower speed document scanning, a test target comprises a white area in the object plane of the scanner. The white area is scanned between original documents being scanned. In this example, the extra scans are feasible because in lower speed operation with adequate spacing between documents being scanned, there is time available between documents being transported through the scanner for these extra scans. In higher document speed scanners, throughput is critical and documents are spaced as close together as possible so that time is not available for the extra scan cycles. Furthermore the white area in the object plane can itself become degraded. Such degradation will then give a false indication of system condition. The system itself may still be operating within acceptable tolerances but the measuring reference white area may have become dirty. Also as described above, automatic gain control based upon a reference area may mask the negative effects of dust and illumination control but the increased gain degrades the signal to noise ratio.

Some known techniques such as histogram analysis attempt to determine the health or condition of an image capture and processing system without extra scan cycles. Histogram analysis examines scanner output to determine if one gray level is more prevalent in the image than any other gray level. Such histogram techniques make assumptions about the type of document that will be scanned. For example, multi-shade or color documents must be analyzed differently from other documents. Therefore histogram techniques are only useful for certain applications such as in diagnostic mode testing. These techniques are also insensitive to isolated picture element failures.

U.S. Pat. No. 5,149,977 of Mita describes a document reader apparatus that automatically detects document skew and inappropriate contrast due to the document itself or to inappropriate binary thresholding. Multiple sensors 116-1 to 116-4 are used to determine whether any part of the document has been lost due to skew.

SUMMARY OF THE INVENTION

An advantage of the present invention is that it provides a continuous indication of the health, or in other words the operating integrity, of the entire system without the need for interfering with document throughput or providing special paper test documents to be inserted into the scanning path.

A further advantage of the invention is that it monitors the entire system from document presentation and scanner output, through image processing.

A still further advantage of the invention is that it schedules maintenance of the system on an actual as needed basis.

These and other advantages are obtained by the instant invention through the means and method of continuously collecting and monitoring the imaging characteristics from work documents being processed and calculating a projected date at which maintenance will be required in order to retain system operating integrity. Minimum and maximum illumination are captured as video values from the output of each picture element sensor for each document. A running indication of system integrity is stored in a white trend array and a black trend array. These arrays are updated after each document has been processed. The change in value of a trend array element depends upon whether the change indicated by the processing of the previous document indicates a deterioration of performance or a return to acceptable performance by the image capture system.

DESCRIPTION OF THE PREFERRED EMBODIMENT

Figure 1:
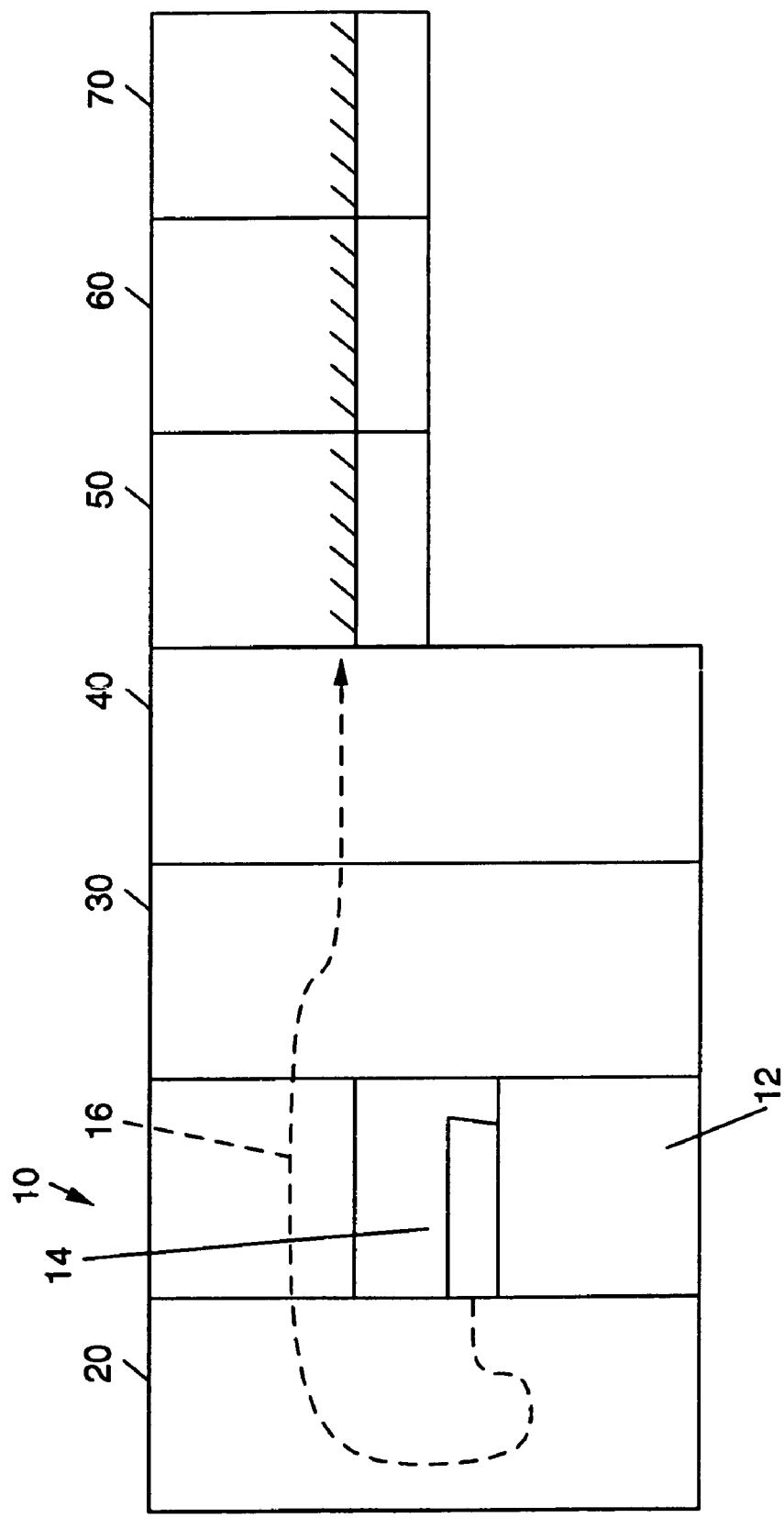
FIG. 1 is a block diagram of a check processing system showing the document transport path.
Figure 2:
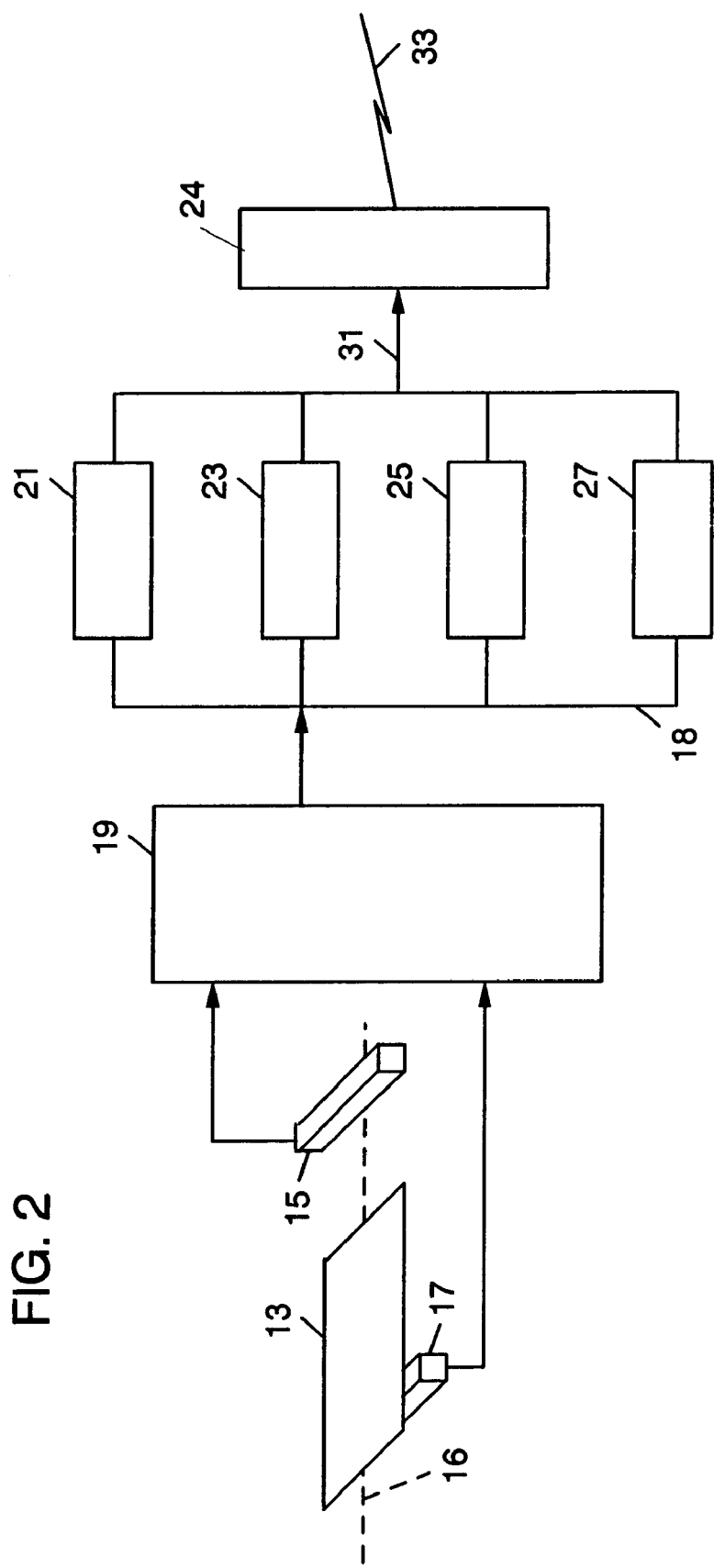
FIG. 2 is a diagram of the scanner and image capture system including the document transport path.

With reference to FIG. 1, a document processing environment in which the preferred embodiment of the invention finds utility will now be described. FIG. 1 shows a bank check processing system such as an IBM 3890/XP, having a number of sections 10 through 70. Section 10 is the feed section. Feed section 10 contains power supplies and other utilities in a lower portion 12 and a feed hopper in a ergonomically located middle portion 14. At section 20, documents are fed from the left end of the hopper into a transport path 16 shown in the form of a broken line. The path first traverses the Magnetic Ink Character Reading section 20. In section 20, the MICR line on each check is read. From section 20, the transport path 16 goes back through an upper portion of feed section 20 to the upper portion of section 10 where the back of the check is endorsed. From there, the check moves to an optional microfilming section 30. From section 30, checks pass through a digital image capturing section 40 and on to a document stacker section 50, 60 or 70. It is in the digital image section 40 that the preferred embodiment of the instant invention finds utility. FIG. 2 is a block diagram of the scanner and computer portions of section 40.

In FIG. 2, the document transport path is again shown schematically as broken line 16. The transport carries a document 13 between scanner devices 15 and 17. Scanner device 15 scans the front of the document and scanner device 17 scans the back side of the document. The scanners are displaced from each other by more than one document length so that the same image processing computer can receive both front and back of a document. Scanner devices 15 and 17 are connected to a scanner adapter circuit card mounted in the image capture section 40. Scanner adapter card 19 provides the images captured to four different image processing computers 21, 23, 25 and 27 on a bus 18. A tracking counter driven by the transport timing, follows each document through the system. The image processing computers 21–27 monitor the tracking counter to determine which document to capture. For example, computer 21 captures each document that is scanned on the count of binary 00. Likewise, computer 23 captures each document that is scanned on the count of binary 01, and computers 25, 27 capture documents that are scanned on the counts of binary 10 and 11 respectively. The use of parallel image processing computers 21–27 provides the high volume throughput of reliable images of both the front and back of each document that is required of the document processor shown in FIG. 1. Example documents that may be processed in this way are bank checks and/or receivable documents that must be further processed for collection or payment. The capture of reliable images of each document reduces the need to forward the actual paper documents for collection or payment. After being processed, each image is transferred to a communication computer 29 over a local area network (LAN) 31. Computer 29 forwards the processed images to a host computer over a communication link 33 for use and archival storage.

Figure 3:
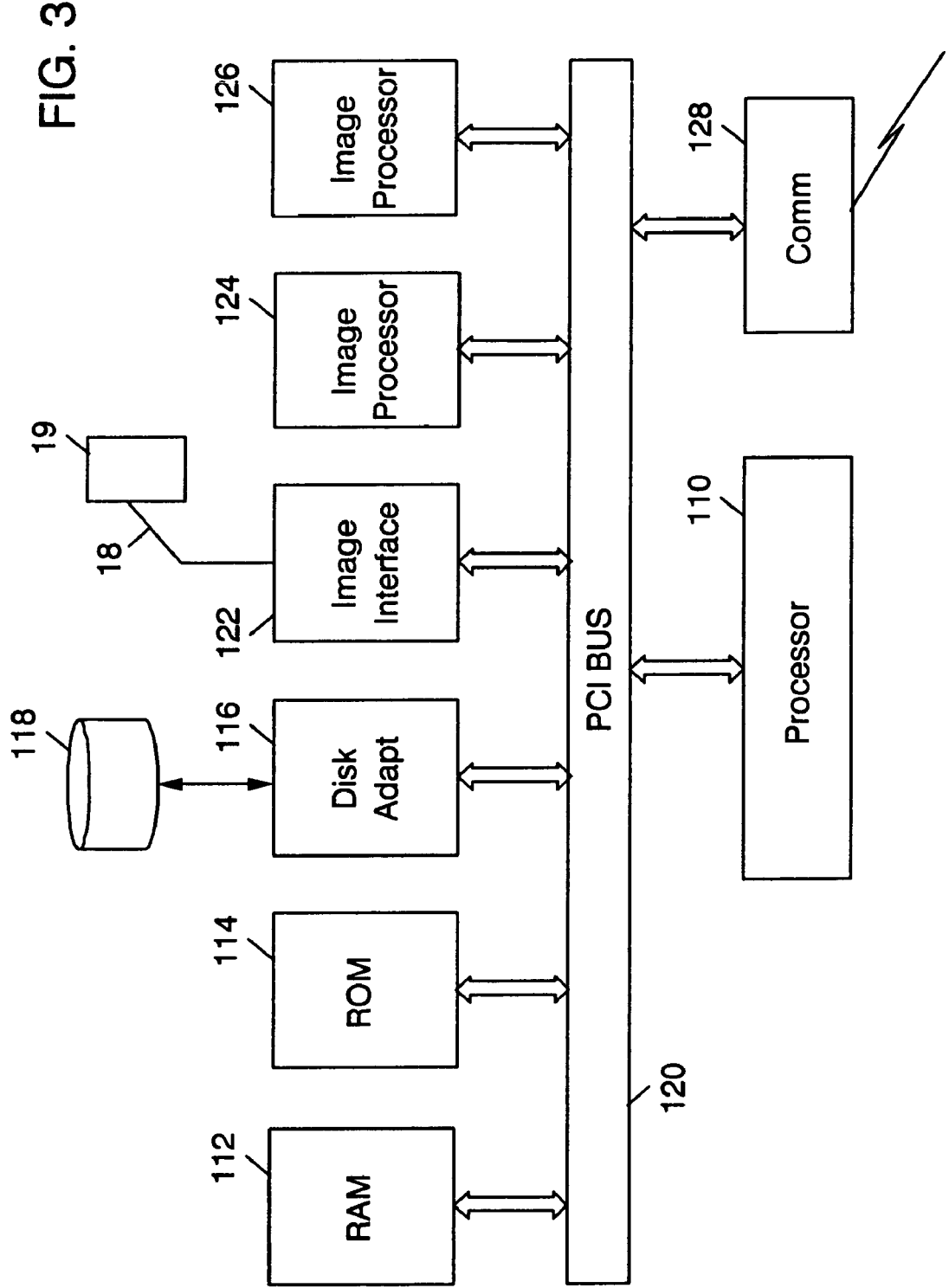
FIG. 3 is a block diagram of one of the four image analyzing and processing computers that implement the four image processing blocks of FIG. 2.

FIG. 3 is a block diagram of an embodiment of one of the image processing computers 21–27 according to the invention. Each image processing computer is a small computer such as may be found in a personal computer, having a processor 110, a random access memory 112, a read only memory 114, a random access disk storage adapter 116 and a random access disk drive 118. The processor 110 is connected to the memories and adapters by a PCI bus 120. In addition to the standard blocks found in many personal computers, each image processing computer of FIG. 3 has an image interface card 122, and image processor cards 124 and 126. Each of these cards will be described below in greater detail.

Each image interface card 122 has a direct cable connection 18 to the scanner adapter card 19 shown in FIG. 2. The image scanned by scanner devices 15 and 17 is made available to all four computers. Routing logic in for example, image processing computer 21, sequences the images as they become available from the scanner adapter card 19 to one of the computers 21–27. In one of the computers 21–27, the image data from scanner devices 15 and 17 is stored in two of three integrated circuit memory modules while the third module may still be transferring image data from a previous document to one of the image processor cards. Since there are two sides to each document and three IC modules in the image interface card 122, data is transferred through the modules in a circulating pattern. That is, each module sometimes stores the face image of a document and later stores the reverse image of another document. This implementation avoids contention between loading and reading the IC modules.

From the IC modules, image data is transferred to the two image processing cards 124 and 126. In the image processing cards, the image data is processed to remove document skew, adjust horizontal and vertical position, normalize the size of the image data and other known steps in capturing images. After the image has been processed, it is transferred to the communication computer 29 via the communications adapter card 128.

In addition to an image of one side of a document, a test image is stored in a designated area of each IC memory module. This test image remains in the IC memory module for repeated use as each captured image is processed. The test image data is read out and processed, each time an IC module is cycled, using the same hardware and software as is used to process document image data. The test image need only be large enough to provide a full test of the image processor card circuits and software. In the preferred embodiment, the test area is approximately one thousand bytes. In this way, the health of the digital portions of the system is verified without needless consumption of system resources.

Figure 4:
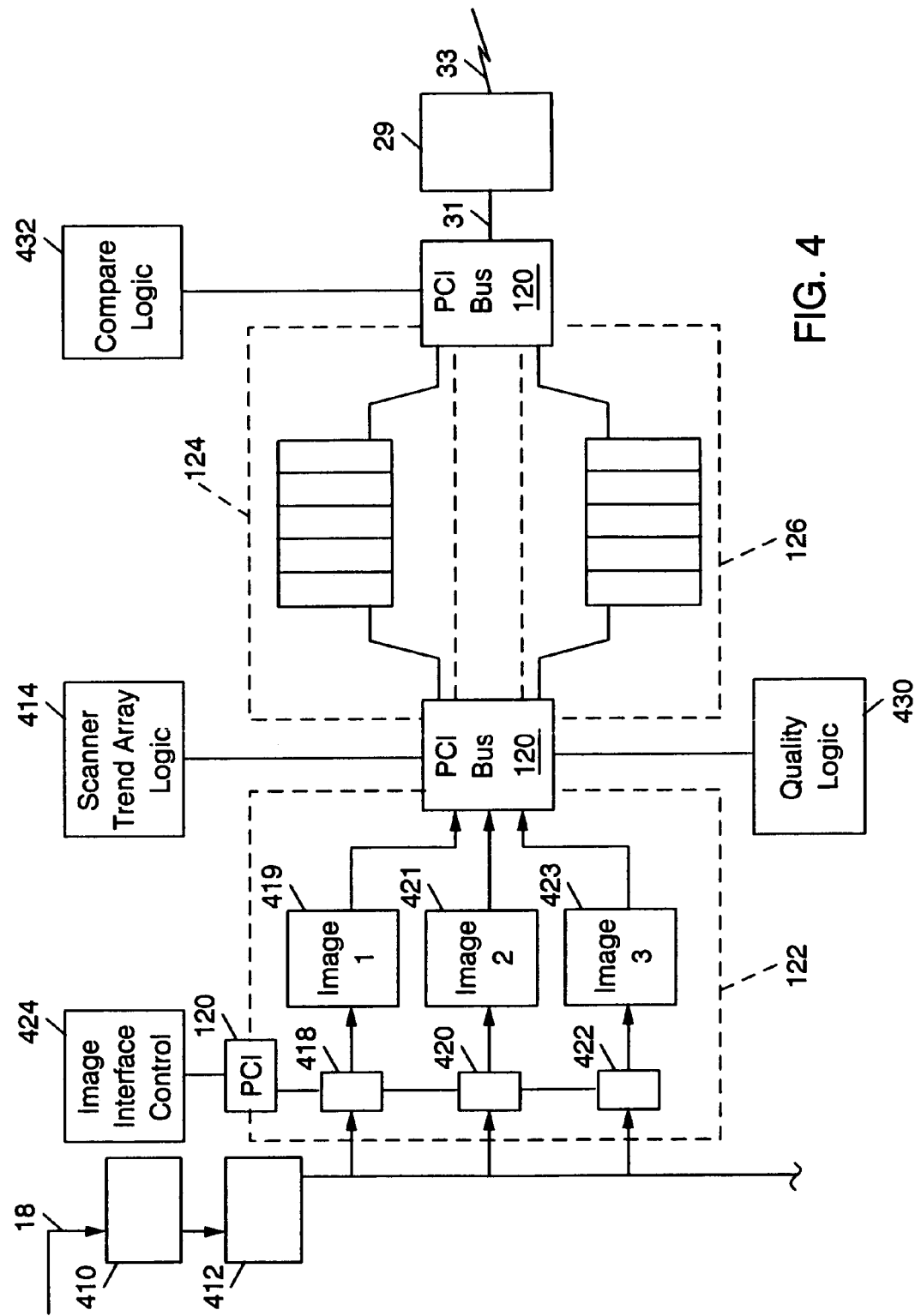
FIG. 4 is a block diagram of some of the special processing cards in a computer of FIG. 3.

FIG. 4 shows a block diagram of software and hardware which embody each image processing computer. The front and rear images of a document arrive at the image interface card 122 of a image processing computer in sequence on a image bus 18. Image bus 18 from the scanner adapter card 19 has image data, tracking and control lines. The image bus data lines are connected to a calibration block 410 in each image processing computer. In the preferred embodiment, the calibration block is implemented in hardware circuits such as a functional memory or programmed logic array. The calibration block modifies scanner picture element (PEL) signal amplitudes as necessary to obtain a uniform video output for each PEL at the same incident light intensity. In addition to the image bus, the calibration block has inputs connected to the PCI bus for receiving control and electronic test image data. This control is used to load the test image data into the IC module image buffers. Such loading need only be done once, unless the image buffers are erased for any reason. An output of the calibration block 410 is connected to a PEL reordering block 412. Block 412 reorders the PEL signal sequence so that multiplexed scanner output is organized into sequential scan lines. The output of the reordering block 412 is connected to buffer selection logic gates 418, 420 and 422. The buffer selection logic gates 418–422 are connected to the PCI bus 120 and controlled by image interface buffer selection programmed control logic 424. Image interface buffer selection logic 424 controls which of three system memory mapped IC memory modules 419, 421 or 423 in the image interface card 122 is to receive the current image being captured. In this way, the front of a document is captured, then the back is captured and then the front of the another document etc.

The image buffer IC modules 419, 421 and 423 are connected by the PCI bus to the two image processing cards 124 and 126. Image data is read out of an IC buffer using burst reads on the PCI bus and temporarily stored in first in-first out buffers on an image processing card 124 or 126. Each image processing card 124 and 126 processes an image, performing such functions as re-sizing, converting to bi-level, and so forth for further recognition processing and compressing the image for archival storage. After processing, the image is transferred via a local area network 31 to a communication computer 29 for transmission to a host processor for archival storage.

After processing each image from an IC module, the image processing card processes the test image data from the same IC module. The result of processing the test image data is made available to compare logic routine 432. Routine 432 compares the processed test image with a stored processed test image that is known to be properly processed. The compare ensures that the image processing card data paths are all operating properly. If an image processor card problem is detected, a health check problem status is posted for reading by the health check control routine.

In addition to being processed in an image processing card, each image is analyzed by quality routine 430. Several embodiments of routine 430 are described in detail in U.S. Pat. No. 5,692,065 which is incorporated herein by reference for all purposes. Routine 430 analyzes each image in each IC module for document presentation problems such as alignment and skew and for scanner problems such as dust, PEL defects and so forth. If a scanner quality problem is detected, a health check problem status is posted for reading by the health check control routine.

While the images are being read out of IC module image buffers 419–423 for image processing, they are also being read out in a multiplexed fashion by scanner trend array logic 414. Scanner trend array logic 414 is described in detail below with respect to FIG. 5. Scanner trend array logic 414 provides a running indication of scanner system integrity by means of a white trend array and a black trend array which represent maximum brightness and minimum brightness at each picture element of each scanner device 15 and 17. These arrays are updated periodically such as after each document has been processed or after passage of a time period. The amount of change in value of a trend array element depends upon whether the change indicated by the processing in the previous period indicates a deterioration of performance or a return to acceptable performance by the scanning portions of the image capture system.

Figure 5:
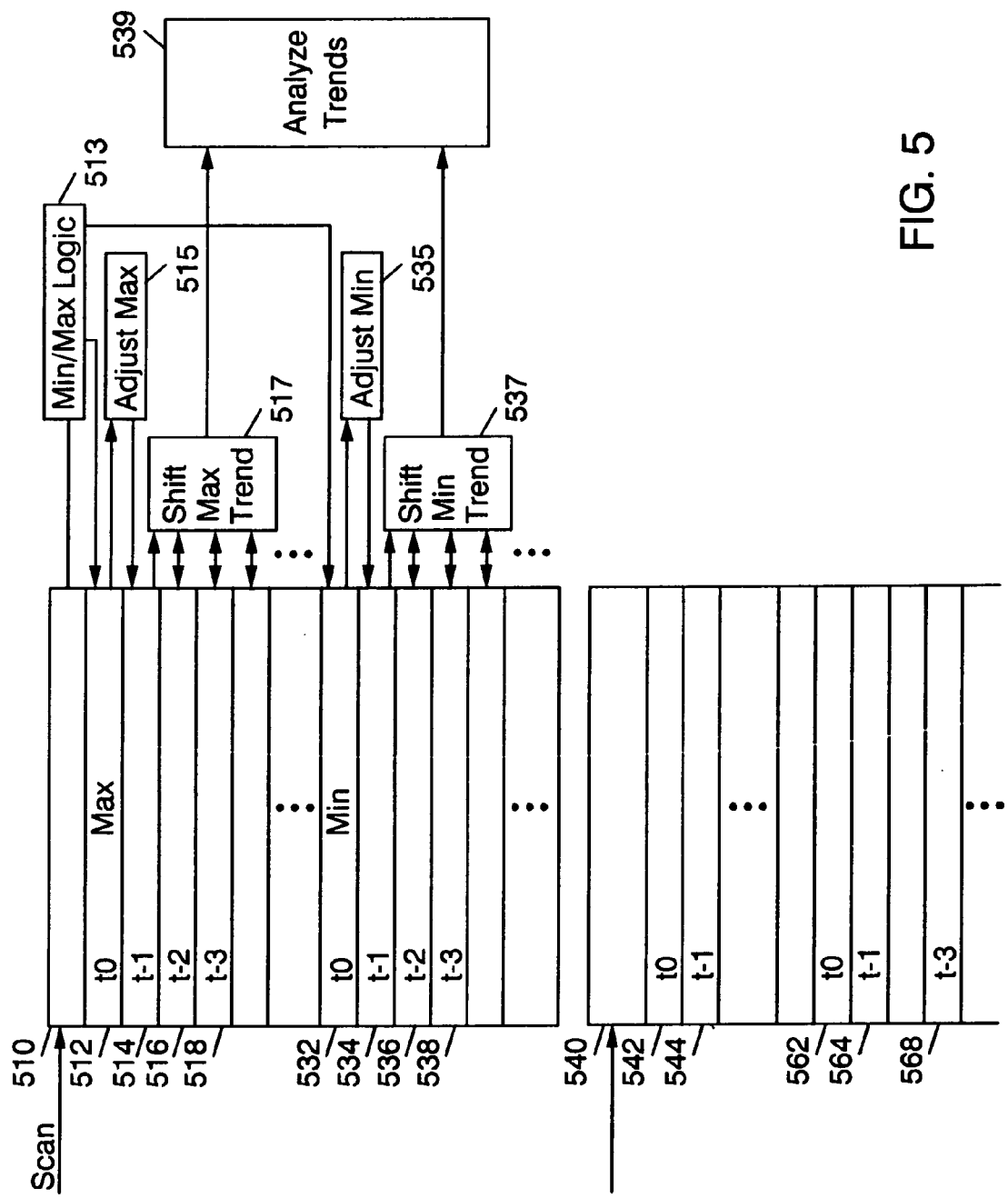
FIG. 5. is a diagram of the trend arrays, trend generating compare logic and maintenance scheduling logic of the invention.

Reference is now made to FIG. 5 where a diagram of the trend arrays, trend generating compare logic and maintenance scheduling logic of the invention are shown. As each scan of an image is received from a image buffer IC module, it is temporarily stored in linear array 510. From array 510, each picture element value is sequentially provided to Min/Max programmed logic 513. Logic 513 compares each picture element value with a corresponding value stored in max array 512 and with a corresponding value stored in min array 532. When the ith picture element value in array 510 is greater than the ith picture element value stored in max array 512, the value of the ith element of array 512 is replaced with the value of the ith element of the array 510. Otherwise the ith element of array 512 is not changed. When the ith picture element value in array 510 is less than the ith picture element value stored in min array 532, the value of the ith element of array 532 is replaced with the value of the ith element of the array 510. Otherwise the ith element of array 532 is not changed. The operation of Min/Max logic 513 continues for each picture element of each scan of an image. In this way, an array of maximum brightness values and an array of minimum brightness values is generated from the array of picture elements captured by scanner device 15 or 17 for each image scanned by a scanner device 15 or 17.

After a predetermined time, which in this example is the time for processing one image, the max array 512 is processed by programmed logic 515 to update t-1 linear array 514. Likewise the min array 532 is processed by programmed logic 535 to update t-1 linear array 534. The steps involved in updating arrays 514 and 534 will be described in detail with respect to FIG. 6. It will be recognized that the predetermined period of time described above may be longer than the time needed to process an image so long as the scans provided to array 510 are always from the same array of picture element devices in a scanner 15 or 17 and that the values provided by the scanners are not mixed in generating the contents of arrays 512 and 532. For the purposes of the instant example, the arrays 510 through 538 contain the trend information values obtained from scanner device 15.

Toward the above described end, another set of arrays 540, 542 through 568 are provided to monitor the trend information values obtained from scanner device 17. The programmed logic 513, 515 and 535 operate on arrays 540 through 568 in the same manner as they operate on the arrays 510 through 538 to generate trend information for scanner device 17. Preferably the arrays 510 through 538 and 540 through 568 are embodied in the form of arrays in random access memory 112 which allows the logic to operate on their content in a convenient manner using well known programming techniques to embody the methods mentioned above and to be described in more detail with respect to FIG. 6.

After a predetermined number of images have been processed, or after a multiple of the predetermined time described above, programmed shift max trend logic 517 moves the content of array 518 to the next available linear array. If 518 is the last linear array of a two dimensional array comprising arrays 514, 516 and 518, then the content of array 518 is merely discarded. In like manner the content of array 516 is moved to array 518 and the content of array 514 is moved to array 516. This leaves array 514 open to begin another cycle of accumulating trend data. In the instant example, the multiple of the predetermined time described above, is a reasonably long time such as several hours or even as much as daily or more. In this way a trend record of the maximum brightness readings is developed.

In the same manner as described above for the two dimensional array comprising arrays 514, 516, 518, shift minimum trend programmed logic 537 shifts the content of the arrays 534, 536 and 538 to develop a trend record of the minimum brightness readings. Even further, maximum brightness trends and minimum brightness trends are developed for scanner device 17 using memory arrays 540 through 568. Again, since the trend arrays are embodied in memory, the same programmed logic can process these arrays 540 through 568 as well in a multiplexed fashion if necessary.

Having generated an array of maximum brightness values over time and an array of minimum brightness values over time for each of scanners 15 and 17, it remains to analyze these arrays to determine a rate of deterioration of image light capture. The rate of deterioration for each image capture picture element is shown by the slope of a rate of change of maximum brightness values in a column of a two dimensional array of values. The slope of column values of arrays 514, 516 and 518 represent the deterioration of white picture element capture for respective image capture element devices in scanner 15. Likewise, the slope of a rate of change of minimum brightness values in columns of arrays 534, 536 and 538 represent the deterioration of black picture element capture for respective image capture element devices in scanner 15.

The slopes of these columns of brightness values are analyzed by analyze trends programmed logic 539. The analysis provided by logic 539 may be done as part of array shifting or after each shifting operation has been completed as may be required in order to relinquish processing resources to higher priority image processing tasks related to image processing cards 124 and 126. Likewise, it is not necessary that every value from every picture element device for every scan be processed by scanner trend array logic 414 in order to maintain a continuing awareness of the health of the scanner devices 15 and 17. Since maximum brightness and minimum brightness values are being processed, most values brought into array 510 for example will not affect the content of arrays 512 and 532 anyway, because they will be medium brightness values. Therefore processing resources can be relinquished to other higher priority tasks as needed and still provide a reasonable level of control over predicting the deterioration of scanner device performance.

OPERATION OF THE PREFERRED EMBODIMENT OF THE INVENTION

Figure 6:
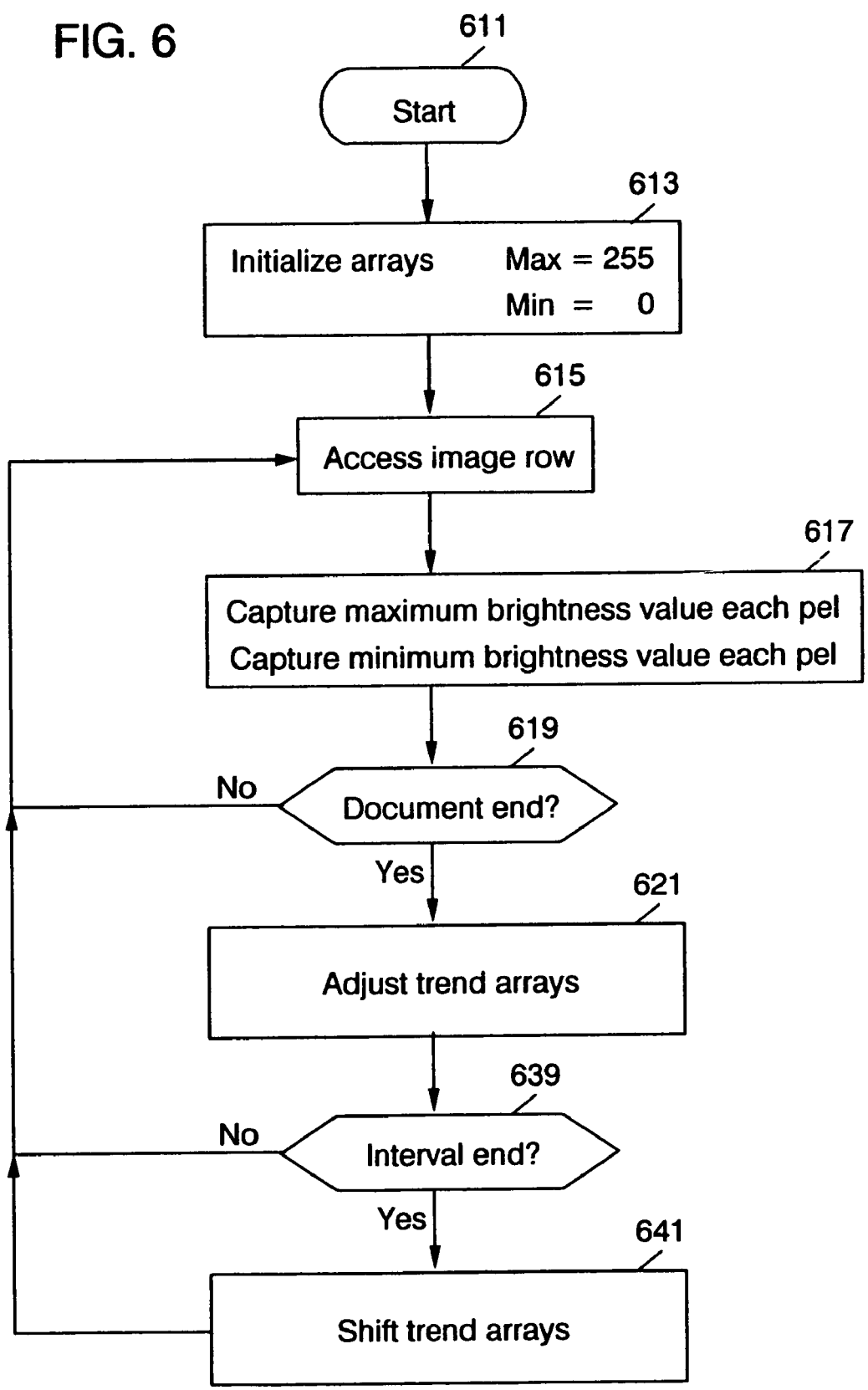
FIG. 6 is a flow diagram of the method of generating the scanner health trends and maintenance scheduling logic of the invention.

Referring now to FIG. 6, a flow diagram of the scanner health check and maintenance scheduling method of the invention is shown. The method starts at block 611 where power is applied to the system or a restart procedure is initiated. The next step 613 is to initialize all cells in arrays 514, 516, 518, 532, 542, 544, etc. to maximum brightness value which is a value of two fifty five in the instant embodiment. Likewise the cells in arrays 512, 534, 536, 538 and 562, 564 through 568 are initialized to minimum brightness value which is a value of zero in the instant embodiment.

After initialization, the system waits for an incoming image that has been scanned and stored in an image buffer such as buffer 419 of FIG. 4. At block 615, an image in the image buffer is then accessed by trend logic 414, one scan row at a time. The brightness value captured by each picture element device of scanner 15 during a scan line is placed in array 510.

In step 617, the brightness value of each cell in array 510 is compared with the brightness value of the corresponding cell in array 512. If the incoming brightness value is greater than the value stored in a corresponding cell in array 512, the corresponding cell of array 512 will be loaded with the incoming brightness value for that picture element device in the first scan. Since array 512 has been initialized to a minimum value of zero, the incoming brightness values are likely to be greater and therefore most of the cells of array 512 will be loaded with the incoming brightness values from corresponding picture element devices captured during the first scan.

In a similar manner the brightness value of each cell in array 510 is compared with the brightness value of the corresponding cell in array 532. If the incoming brightness value is less than the value stored in a corresponding cell in array 532, the corresponding cell of array 532 will be loaded with the incoming brightness value for that picture element device in the first scan. Since array 532 has been initialized to a maximum value of two fifty five, the incoming brightness values are likely to be less and therefore most of the cells of array 532 will be loaded with the incoming brightness values from corresponding picture element devices captured during the first scan.

The decision block at step 619 causes steps 615 and 617 to be repeated for each scan line of an image captured by scanner 15, with the result that array 512 stores the brightest value captured by each of the picture element devices while scanning a document. Likewise array 532 stores the darkest value captured by each of the picture element devices while scanning the document.

Figure 7:
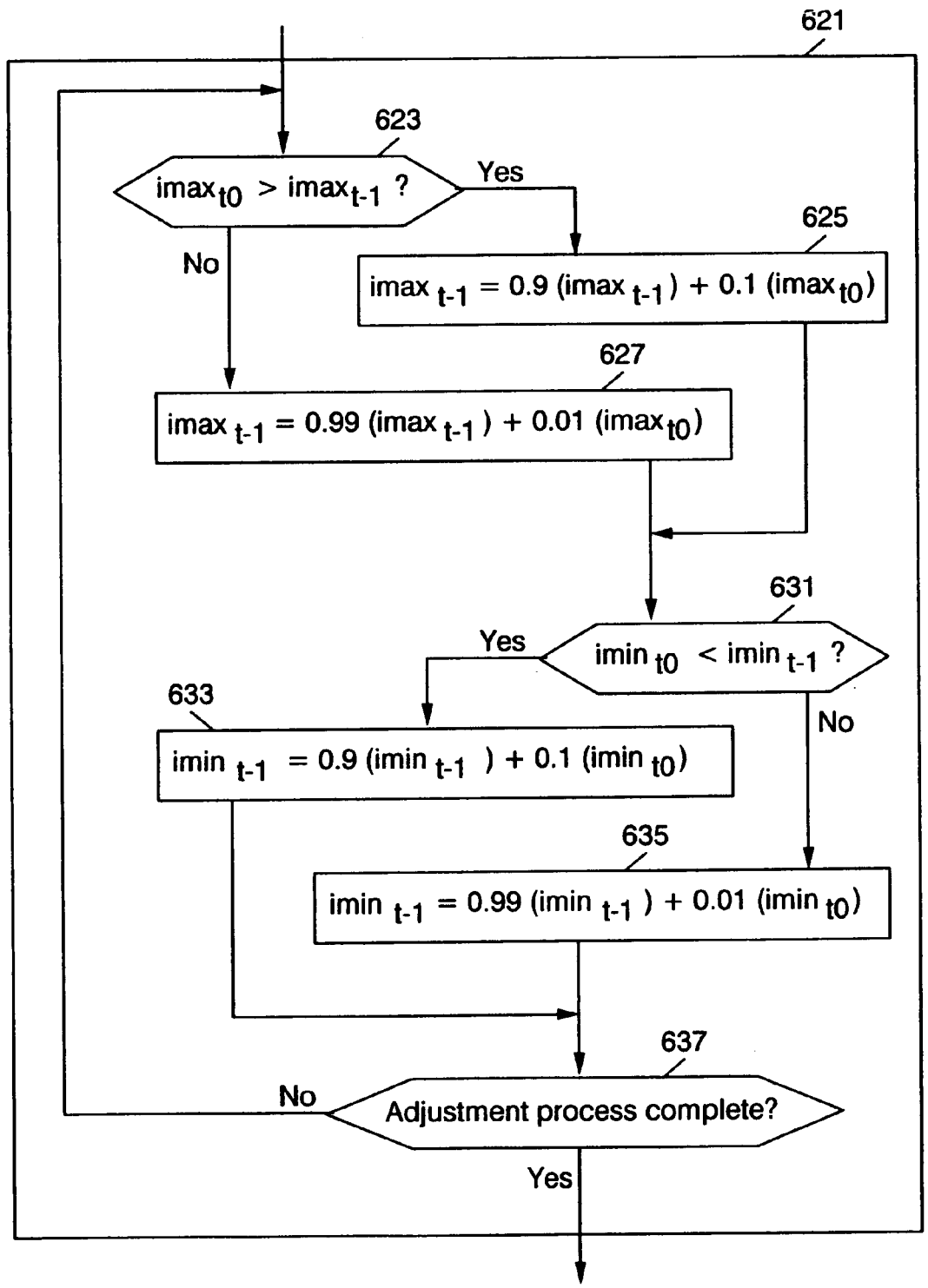
FIG. 7 is a flow diagram of the adjustment process of block 621 of FIG. 6.

When the entire image of the document in buffer 419 has been processed for the maximum and minimum of the values captured by each picture element device, the method moves to step 621. Step 621 comprises a number of substeps as shown in FIG. 7. Step 621 adjusts the content of trend arrays 514 and 534 with weighting factors so that the adjusted maximum and minimum values represent a cumulative indication of scanner performance at time intervals t-1. Step 621 is a repetitive process that steps through each of the 1024 cells of maximum and minimum values and adjusts the maximum brightness (white) trend array 514 and the minimum brightness (dark) trend array 534 in a manner that depends upon whether the performance appears to be improving or degrading.

As part of step 621, linear arrays 512 and 532 are re-initialized to zero and 255 respectively, in preparation for capturing the next maximum and minimum picture element values.

From step 621 the process flows to step 639 where the interval over which performance is measured is tested for completion. The interval may be any reasonably longer period such as a fraction of an hour, an hour, multiple hours or even a day or more. The interval may also be based on a document count. If the interval has not ended, the process continues to access the image buffer to capture maximum and minimum brightness values from documents as they are being processed. It will be understood that in view of the longer interval and the variability of documents being processed, it is not important that every scan of every document be captured in order to obtain a good indication of scanner system health. Accordingly, the process of FIG. 6 can be a low priority process that runs when other higher priority processes such as image processing is not consuming all of the computer resources.

If at block 639, the interval is found to have expired, the method flows to block 641 where the content of trend arrays t-1, t-2, and t-3 are shifted by logic 537 so that the t-1 arrays are available to gather another trend point in the next interval.

Returning to block 621 of FIG. 6, the substeps of block 621 are shown in FIG. 7. Step 621 in FIG. 7 begins at step 623 where the value $i_{t0}$ stored in cell zero of array 512 is compared with the value $i_{t-1}$ stored in cell zero of array 514.

If at decision block 623, the value $i_{t0}$ is found to be greater than the value $i_{t-1}$, then at block 625, ninety percent of the value $i_{t-1}$ is added to ten percent of the value $i_{t0}$. This provides a relatively fast adjustment in the direction indicating improved performance. Block 625 legend indicates that $i_{t-1}=0.9(i_{t-1})+0.1(i_{t0})$. From block 625, the method goes to block 631 which initiates adjustment of the minimum or dark performance trend level as will be explained below.

If at decision block 623, $i_{t0}$ is found to be less than or equal to $i_{t-1}$, then at step 627, ninety nine percent of the value $i_{t-1}$ added to one percent of the value $i_{t0}$. This provides a relatively slower adjustment in the direction indicating degrading performance. Step 627 legend indicates that $i_{t-1}=0.99(i_{t-1})+0.01(i_{t0})$.

Step 621 continues at step 631 where the value $i_{t0}$ stored in cell zero of array 532 is compared with the value $i_{t-1}$ stored in cell zero of array 534.

If at decision block 631, the value $i_{t0}$ is found to be less than the value $i_{t-1}$, then at block 633, ninety percent of the value $i_{t-1}$ is added to ten percent of the value $i_{t0}$. This provides a relatively fast adjustment in the direction indicating improved performance. Block 633 legend indicates that $i_{t-1}=0.9(i_{t-1})+0.1(i_{t0})$. From block 633, the method goes to block 637 which provides the loop to process each of the cells 0 through 1023.

If at decision block 631, $i_{t0}$ is found to be greater than or equal to $i_{t-1}$, then at step 635, ninety nine percent of the value $i_{t-1}$ added to one percent of the value $i_{t0}$. This provides a relatively slower adjustment in the direction indicating degrading performance. Step 635 legend indicates that $i_{t-1}=0.99(i_{t-1})+0.01(i_{t0})$.

Having described the system, apparatus and method of the invention, it will be understood by those skilled in the art of image capture that many additional modifications and adaptations to the present invention can be made in both embodiment and application without departing from the spirit of this invention. For example, although the invention has been described with respect to a check processing system, the invention is applicable to other image capture systems. Likewise, the preferred embodiment employs programmed logic but the invention is equally applicable to logic embodied directly in integrated circuits, and accordingly, a fixed embodiment or an alternate programming architecture may be used. Accordingly, this description should be considered as merely illustrative of the principles of the present invention and not in limitation thereof.

We claim:

1. A document image capture and processing system comprising:
    a document scanner for scanning a document and providing a digital image of information on the document to an image buffer;
    a document transport for transporting paper documents past the document scanner;
    a computer having a trend array for storing maximum values of scanner output as a document is scanned;
    trend analyzer logic in the computer for evaluating the maximum values in the trend array to determine a rate of scanner performance deterioration;
    adjust logic in the computer for adjusting the maximum values of scanner picture element output in an initial row of the trend array after an interval to generate an adjusted maximum value for each scanner picture element;
    the adjust logic in the computer, adjusting a maximum picture element value by a larger amount when the maximum value of scanner picture element output indicates a return to acceptable performance by the scanning portion of the image system and adjusting a maximum picture element value by a smaller amount when the maximum value of scanner picture element output indicates a deterioration of acceptable performance by the scanning portion of the image system.

2. The document image capture system of claim 1 further comprising:
    trend array shift logic in the computer for shifting the adjusted maximum value of each scanner picture element output from the initial row of the trend array after an interval to an adjacent row in the trend array to generate a column of adjusted maximum values for each scanner picture element;
    the trend analyzer logic responding to a slope of a rate of change of adjusted maximum values in a column of adjusted maximum values for a scanner picture element to generate a projection of when maintenance will be required.

3. The document image capture system of claim 2 further comprising:
    image analyzer logic responsive to image data in the image buffer for analyzing each image to detect defects in image capture portions of the system.

4. The document image capture system of claim 3 wherein the image analyzer logic further comprises:
    a document centering detector for monitoring the document centering function of the document transport;
    a document skew detector for monitoring the document aligning function of the document transport; and
    a maximum video gradient detector for monitoring scanner picture element sensors and data path by detecting a maximum contrast of the digital image of information on the document in the image buffer.

5. Method for indicating operating integrity of a document image capture and processing system comprising steps of:
    transporting paper documents past a document scanner;
    scanning a document and providing a digital image of information on the document to an image buffer;
    storing maximum values of scanner output in a computer trend array as a document is scanned;
    evaluating the maximum values in the trend array to determine a rate of scanner performance deterioration;
    adjusting the maximum values of scanner picture element output in an initial row of the trend array after an interval to generate an adjusted maximum value for each scanner picture element; and
    adjusting a maximum picture element value by a larger amount when the maximum value of scanner picture element output indicates a return to acceptable performance by the scanning portion of the image system and adjusting a maximum picture element value by a smaller amount when the maximum value of scanner picture element output indicates a deterioration of acceptable performance by the scanning portion of the image system.

6. Method of claim 5 further comprising steps of:
    shifting the adjusted maximum value of each scanner picture element output from the initial row of the trend array after an interval to an adjacent row in the trend array to generate a column of adjusted maximum values for each scanner picture element; and responding to a slope of a rate of change of adjusted maximum values in a column of adjusted maximum values for a scanner picture element to generate a projection of when maintenance will be required.

7. Method for indicating operating in integrity of a document image capture and processing system comprising steps of:

transporting paper documents past a document scanner;

scanning a document and providing a digital image of information on the document to an image buffer;

storing maximum values of scanner output in a computer trend array as a document is scanned;

storing minimum values of scanner output in the trend array as a document is scanned; and evaluating the maximum values in the trend array and the minimum values in the minimum trend array to determine a rate of scanner performance deterioration.

8. Method of claim 6 further comprising step of:

responding to image data in the image buffer by analyzing each image to detect defects in image capture portions of the system.

9. Method of claim 8 wherein the image analyzing step further comprises:

monitoring the document centering function of the document transport;

monitoring the document aligning function of the document transport; and monitoring scanner picture element sensors and data path by detecting a maximum contrast of the digital image of information on the document in the image buffer.

10. A program on a computer usable medium for indicating operating integrity of a document image capture and processing system, the program on the computer usable medium comprising:

programmed logic means for comparing a value captured at each picture element during each scan line of an image with the value captured by the picture element during a preceding scan line to collect a maximum value captured by the picture element during scanning of the image;

programmed trend array logic means including a trend array for storing maximum values of scanner output as documents are scanned;

programmed trend analyzer logic means for evaluating the maximum values in the trend array to determine a rate of scanner performance deterioration.

11. The program of claim 10 further comprising:

programmed adjust logic means for adjusting the maximum values of scanner picture element output in an initial row of the trend array after an interval to generate an adjusted maximum value for each scanner picture element;

the programmed adjust logic means, adjusting a maximum picture element value by a larger amount when the maximum value of scanner picture element output indicates a return to acceptable performance by the scanning portion of the image system and adjusting a maximum picture element value by a smaller amount when the maximum value of scanner picture element output indicates a deterioration of acceptable performance by the scanning portion of the image system.

12. The program of claim 11 further comprising:

programmed trend array shift logic means for shifting the adjusted maximum value of each scanner picture element output from the initial row of the trend array after an interval to an adjacent row in the trend array to generate a column of adjusted maximum values for each scanner picture element;

the programmed trend analyzer logic means responding to a slope of a rate of change of adjusted maximum values in a column of adjusted maximum values for a scanner picture element to generate a projection of when maintenance will be required.

13. The program of claim 10 further comprising:

the programmed trend array logic means including a minimum trend array for storing minimum values of scanner output as documents are scanned; and the programmed trend analyzer logic means, evaluating the maximum values in the trend array and the minimum values in the minimum trend array to determine a rate of scanner performance deterioration.

14. The program of claim 10 further comprising:

programmed image processor logic means for processing information received from the image buffer;

programmed interleave control logic means for interleaving a test digital image of known information between digital images of information on documents in the image buffer;

programmed comparator logic means for comparing processed test image result information with expected result information to detect defects in image processing portions of the system;

the indications of detects detected by the comparator and the rate of scanner performance deterioration are indications of the health of image processing portions and scanner devices of the system.

15. The program of claim 12 further comprising:

programmed image analyzer logic means responsive to image data in the image buffer for analyzing each image to detect defects in image capture portions of the system.

16. The program of claim 15 wherein the programmed image analyzer logic means further comprises:

programmed document centering detector means for monitoring the document centering function of the document transport;

programmed document skew detector means for monitoring the document aligning function of the document transport; and programmed maximum video gradient detector means for monitoring scanner picture element sensors and data path by detecting a maximum contrast of the digital image of information on the document in the image buffer.

* * * * *